United States Patent
Maezawa

(10) Patent No.: US 10,629,177 B2
(45) Date of Patent: Apr. 21, 2020

(54) SOUND SIGNAL PROCESSING METHOD AND SOUND SIGNAL PROCESSING DEVICE

(71) Applicant: YAMAHA CORPORATION, Hamamatsu-shi (JP)

(72) Inventor: Akira Maezawa, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 0 days.

(21) Appl. No.: 16/117,154

(22) Filed: Aug. 30, 2018

(65) Prior Publication Data

US 2018/0374463 A1    Dec. 27, 2018

Related U.S. Application Data

(63) Continuation of application No. PCT/JP2017/009745, filed on Mar. 10, 2017.

(30) Foreign Application Priority Data

Mar. 11, 2016  (JP) ................................. 2016-048562

(51) Int. Cl.
  G10H 1/36    (2006.01)
  G10G 3/04    (2006.01)
  (Continued)

(52) U.S. Cl.
  CPC ........... G10H 1/368 (2013.01); G06F 17/141 (2013.01); G10G 3/04 (2013.01); G10H 1/0025 (2013.01);
  (Continued)

(58) Field of Classification Search
  CPC ........ G10H 1/368; G10H 1/42; G10H 1/0025; G10H 2250/235; G10H 2210/051; G06F 17/141; G10G 3/04
  (Continued)

(56) References Cited

U.S. PATENT DOCUMENTS 8,344,234 B2   1/2013  Sugai
9,087,501 B2 * 7/2015  Maezawa ............... G10H 7/002
(Continued)

FOREIGN PATENT DOCUMENTS

JP    2000221979 A    8/2000
JP    2002116454 A    4/2002
(Continued)

OTHER PUBLICATIONS

English translation of Written Opinion issued in Intl. Appln. No. PCT/JP2017/009745 dated May 23, 2017, previously cited in IDS filed Aug. 30, 2018.
(Continued)

*Primary Examiner* — Jeffrey Donels
(74) *Attorney, Agent, or Firm* — Rossi, Kimms & McDowell LLP

(57) ABSTRACT

Provided is a sound signal processing method including a step of acquiring a unit time length in an input sound signal, a step of calculating a tone feature amount from the input sound signal, a step of calculating an index indicating validity of time lengths in a case where the time lengths are assumed the time lengths of one beat and one measure using the unit time length as a reference in the input sound signal with respect to the tone feature amount, and a step of estimating the time lengths of one beat and one measure using the unit time length as a reference based on the index.

12 Claims, 6 Drawing Sheets

(51) Int. Cl.
*G06F 17/14* (2006.01)
*G10H 1/00* (2006.01)
*G10H 1/42* (2006.01)

(52) U.S. Cl.
CPC ......... *G10H 1/42* (2013.01); *G10H 2210/051* (2013.01); *G10H 2250/235* (2013.01)

(58) Field of Classification Search
USPC .......................................................... 84/600
See application file for complete search history.

(56) References Cited

U.S. PATENT DOCUMENTS

| | | | | |
|---|---|---|---|---|
| 9,280,961 | B2* | 3/2016 | Eronen | G10H 1/00 |
| 2008/0115656 | A1 | 5/2008 | Sumita | |
| 2011/0255700 | A1* | 10/2011 | Maxwell | H04R 5/027 |
| | | | | 381/58 |
| 2014/0338515 | A1* | 11/2014 | Sheffer | G10H 1/36 |
| | | | | 84/609 |
| 2014/0358265 | A1* | 12/2014 | Wang | G10H 1/40 |
| | | | | 700/94 |
| 2015/0094835 | A1* | 4/2015 | Eronen | G06F 3/165 |
| | | | | 700/94 |

FOREIGN PATENT DOCUMENTS

| | | |
|---|---|---|
| JP | 2007052394 A | 3/2007 |
| JP | 2008275975 A | 11/2008 |
| JP | 2015114361 A | 6/2015 |
| JP | 2015200803 A | 11/2015 |
| WO | 2009125489 A1 | 10/2009 |

OTHER PUBLICATIONS

International Search Report issued in Intl. Appln. No. PCT/JP2017/009745 dated May 23, 2017. English translation provided.

Written Opinion issued in Intl. Appln. No. PCT/JP2017/009745 dated May 23, 2017.

Shoji et al. "Downbeat Estimation of Acoustic Signals of Music with Irregular Meter." Journal of the Acoustical Society of Japan. Dec. 1, 2012: 595-604. vol. 68, No. 12.

* cited by examiner

FIG.7

| m | b | P0 | REMARKS |
|---|---|-----|----------|
| 2 | 2 | 0.5 | 2/4 BEAT |
| 2 | 3 | 0.6 | 6/8 BEAT |
| 2 | 4 | 0.3 | 2/4 BEAT |
| 3 | 2 | 0.7 | 3/4 BEAT |
| 3 | 3 | 0.0 | 9/8 BEAT |
| 3 | 4 | 0.6 | 3/4 BEAT |
| 4 | 2 | 1.0 | 4/4 BEAT |
| 4 | 3 | 0.1 | 12/8 BEAT |
| 4 | 4 | 0.9 | 4/4 BEAT |

SOUND SIGNAL PROCESSING METHOD AND SOUND SIGNAL PROCESSING DEVICE

CROSS REFERENCE TO RELATED APPLICATION(S)

This application is a continuation of the international patent application No. PCT/JP2017/009745 which was filed on Mar. 10, 2017, claiming the benefit of priority of Japanese Patent Application No. 2016-048562 filed on Mar. 11, 2016, the contents of which are incorporated herein by reference in its entirety.

BACKGROUND OF THE INVENTION

1. Field of the Invention

The present invention relates to a technology of estimating time lengths of beats and measures in a musical piece from a sound signal indicating the musical piece.

2. Description of the Related Art

There is known a technique of analyzing a sound signal. For example, Patent Literatures 1 and 2 disclose techniques using a probability model to estimate beat points, tempos, measure positions, and chords of a musical piece from a sound signal indicating the musical piece.
  Patent Literature 1: JP-A-2015-114361
  Patent Literature 2: JP-A-2015-200803

SUMMARY OF THE INVENTION

In the techniques disclosed in Patent Literatures 1 and 2, it is necessary to define a transition probability model of beat points, tempos, beats, and chord progression in advance.

With this regard, the present invention provides a technology of more simply estimating lengths of beats and measures from an input sound signal.

An aspect of the present invention provides a sound signal processing method including: acquiring a unit time length in an input sound signal which indicates a musical piece; calculating a tone feature amount from the input sound signal; calculating, in a case where time lengths of one beat and one measure in the musical piece are assumed using the unit time length as a reference in the input sound signal with respect to the tone feature amount, a first index which indicates validity of the assumed time lengths; and estimating the time lengths of one beat and one measure using the unit time length as a reference based on the first index.

Another aspect of the present invention provides a sound signal processing device including: at least one memory storing instructions; and at least one processor configured to implement the stored instructions to execute a plurality of tasks, including: a unit-time acquisition task that acquires a unit time length in an input sound signal indicating a musical piece; a feature amount calculation task that calculates a tone feature amount from the input sound signal; a first index calculation task that calculates, in a case where time lengths of one beat and one measure in the musical piece are assumed using the unit time length as a reference in the input sound signal with respect to the tone feature amount, a first index which indicates validity of the assumed time lengths; and an estimation task that estimates the time lengths of one beat and one measure using the unit time length as a reference based on the first index.

The index may be calculated using a priority which is set in advance with respect to a combination of the time lengths of one beat and one measure.

According to the present invention, it is possible to more simply estimate lengths of beats and measures from an input sound signal.

BRIEF DESCRIPTION OF THE DRAWINGS

FIG. 7 is a table illustrating stored priorities.

DETAILED DESCRIPTION

1. Configurations

Figure 1:
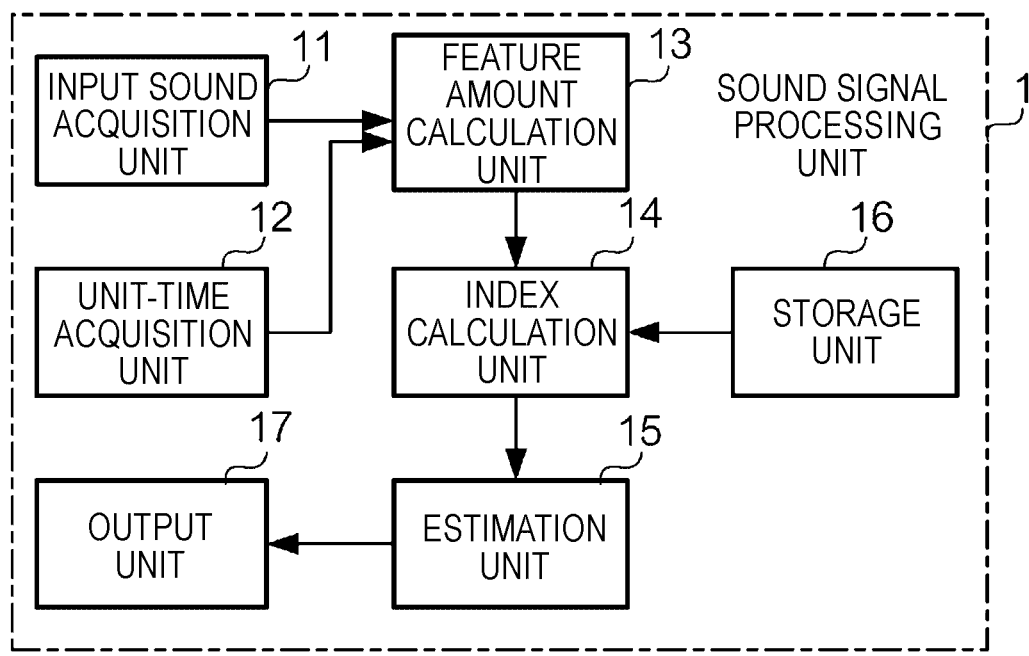
FIG. 1 is a diagram illustrating a functional configuration of a sound signal processing device 1 according to an embodiment.

FIG. 1 is a diagram illustrating a functional configuration of a sound signal processing device 1 of an embodiment. The sound signal processing device 1 is a device which estimates a beat in a musical piece from a sound signal (hereinafter, referred to as "input sound signal") indicating the musical piece.

The sound signal processing device 1 includes an input sound acquisition unit 11, a unit-time acquisition unit 12, a feature amount calculation unit 13, an index calculation unit 14, an estimation unit 15, a storage unit 16, and an output unit 17. The input sound acquisition unit 11 acquires a sound signal indicating the musical piece which is an input sound signal, that is, a processing target described below. The unit-time acquisition unit 12 acquires a unit time length in the input sound signal. The feature amount calculation unit 13 calculates a tone feature amount from the input sound signal. In a case where time lengths of one beat and one measure are assumed using the unit time length as a reference in the input sound signal with respect to the tone feature amount calculated by the feature amount calculation unit 13 the index calculation unit 14 calculates an index indicating validity of the assumed time lengths. The estimation unit 15 estimates the time lengths of one beat and one measure using the unit time length as a reference based on the index calculated by the index calculation unit 14.

Figure 2:
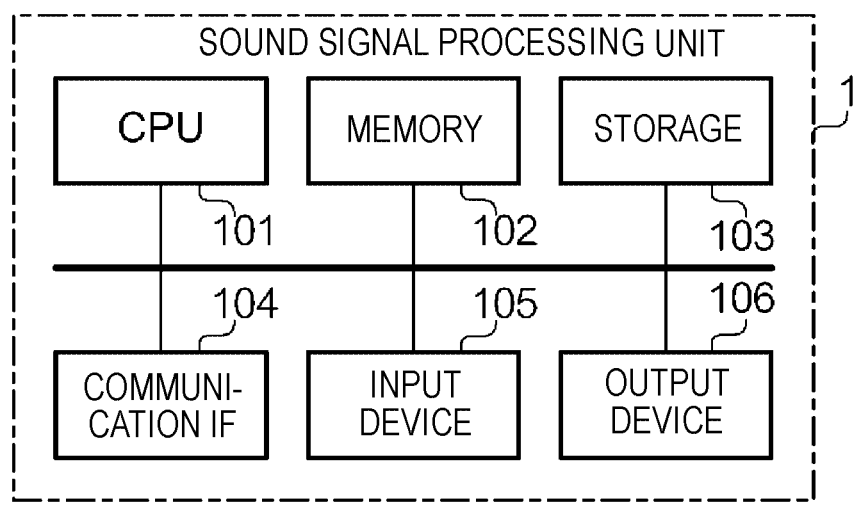
FIG. 2 is a diagram illustrating a hardware configuration of the sound signal processing device 1.

The storage unit 16 stores a priority which is predetermined in advance with respect to a combination of the time lengths of one beat and one measure. In this example, the estimation unit 15 estimates the time lengths of one beat and one measure based on the priority stored in the storage unit 16. The output unit 17 outputs information on the time lengths of one beat and one measure which is estimated by the estimation unit 15, FIG. 2 is a diagram illustrating a hardware configuration of the sound signal processing device 1. The sound signal processing device 1 is a computer which includes a CPU (Central Processing Unit) 101, a memory 102, a storage 103, a communication interface 104, an input device 105, and an output device 106. The CPU 101 is a control device which controls each part of the sound signal processing device 1. The memory 102 is a main memory device as a working area when the CPU 101 executes a program. The storage 103 is a nonvolatile storage device which stores various types of programs and data. The communication interface 104 is a device which communicates with other devices in conformity with a predetermined communication protocol. The input device 105 is a device to input information to the sound signal processing device, and includes at least one of a microphone, a touch screen, a keypad, and a button, for example. The output device 106 is a device to output information, and includes at least one of a display and a speaker, for example.

The storage 103 stores a program which causes the computer to serve as the sound signal processing device 1. The CPU 101 executes the program to install the function illustrated in FIG. 1. The CPU 101 executing the program is an example of the input sound acquisition unit 11, the unit-time acquisition unit 12, the feature amount calculation unit 13, the index calculation unit 14, and the estimation unit 15. The memory 102 and the storage 103 are an example of the storage unit 16. The output device 106 is an example of the output unit 17.

2. Operations

Figure 3:
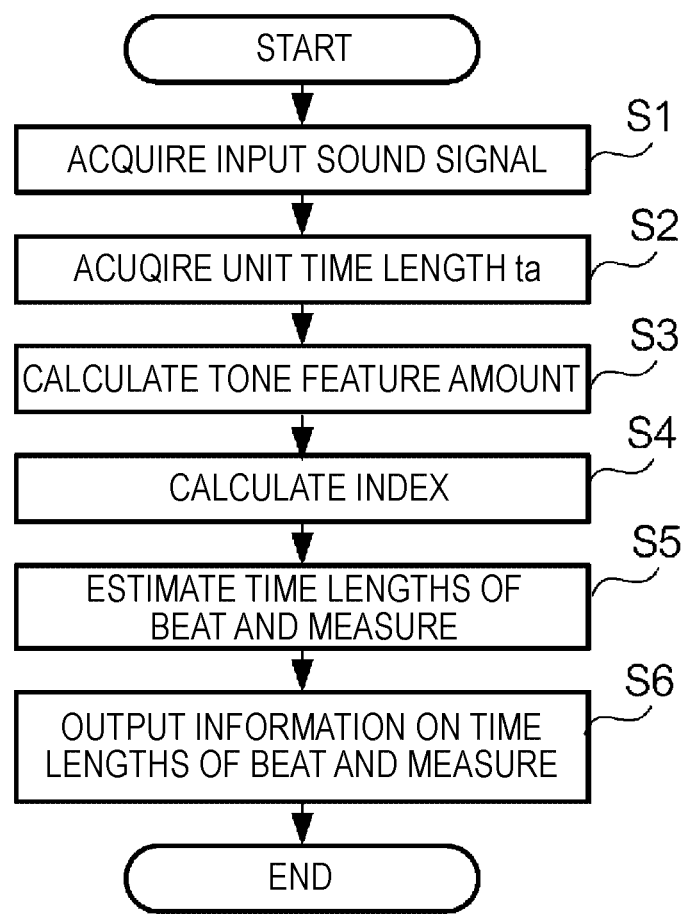
FIG. 3 is a flowchart illustrating an operation of the sound signal processing device 1.

FIG. 3 is a flowchart illustrating an operation of the sound signal processing device 1. The flow of FIG. 3 starts when the program is activated, for example. The flow relates to a sound signal processing method of estimating the time lengths of beats and measures of the musical piece. For example, if the beat is a multiple of an eighth note, estimating the time lengths of beats and measures corresponds to obtaining the number b of eighth notes for one beat and the number m of beats for one measure. The parameter m indicates that the musical piece is of m beats. For example, the musical piece of 2 beats indicates m=2, the musical piece of 3 beats indicates m=3, and the musical piece of 4 beats indicates m=4. The estimation of the time lengths of beats and measures will be performed in detail as follows.

In Step S1, the input sound acquisition unit 11 acquires the input sound signal. The input sound signal is, for example, a sound signal of the musical piece based on non-compressed or compressed (way, mp3, etc.) sound data, but the present invention is not limited thereto. The sound data may be stored in the storage 103 in advance, or may be input from the outside of the sound signal processing device 1.

In Step S2, the unit-time acquisition unit 12 acquires a unit time length ta. The unit time length ta means a minimum unit of musical time in the musical piece, for example, it said a repeating unit of performing sound of a musical instrument (for example, an interval from one stroke to next stroke of a high hat in a case where a rhythm is split using the high hat). For example, the unit time length ta corresponds to the length of an eighth note or a sixteenth note in the musical piece. As an example, the unit-time acquisition unit 12 calculates the unit time length ta by analyzing the input sound signal. A well-known technique is used to calculate the unit time length ta. Alternatively, the unit time length ta may be designated by a user's command input. In this case, the unit-time acquisition unit 12 acquires the unit time length ta according to the user's command input. Specifically, for example, the user repeatedly pushes a button (or taps a touch screen) at timing corresponding to the unit time length in synchronization with an input sound. The unit-time acquisition unit 12 determines the unit time length ta corresponding to the repetition input.

The timing (for example, timing of sounding a high hat) which is automatically calculated by the sound signal processing device 1 and designated by a user's command input is not always exactly periodic. Therefore, the unit time length ta acquired in Step S2 does not need to be constant all over the analyzing target sections in the input sound signal. The input sound signal is divided into a plurality of sections. The unit time length ta in each section may be different. In other words, the unit time length ta is an example of the time length to smooth the tone feature amount described below. Alternatively, the sound signal processing device 1 may use a method of calculating an average value to determine a constant unit time length ta all over the analyzing target sections. In this case, a portion (for example, a portion where a tempo is changed in the music) in which a variation of timing interval in the musical piece exceeds a threshold (for example, 10% of an average value) may be processed differently from the other portions by the sound signal processing device 1.

The description will be given with reference to FIG. 3 again. In Step S3, the feature amount calculation unit 13 calculates the tone feature amount. In this example, an MFCC (Mel Frequency Cepstrum Coefficient) is used as the tone feature amount. The MFCC is a multidimensional vector (for example, 12-dimension). The MFCC is well known as a parameter indicating a tone characteristic in the sound signal. The MFCC is calculated using a well-known technique. The MFCC is calculated at every time frame using the unit time length ta designated in each time frame as a unit. In other words, in Step S3, a characteristic series x[d, t] of the MFCC is obtained. The characteristic series x[d, t] indicates a d-th dimension characteristic amount at time t ($d \in [0, D]$, $t \in [0, T]$). Time t is represented using the unit time length ta as a unit.

In Step S4, the index calculation unit 14 calculates an index. The index indicates the validity of the assumed time length in a case where the time lengths of one beat and one measure are assumed using the unit time length ta as a reference in the input sound signal with respect to the tone feature amount.

Figure 4:
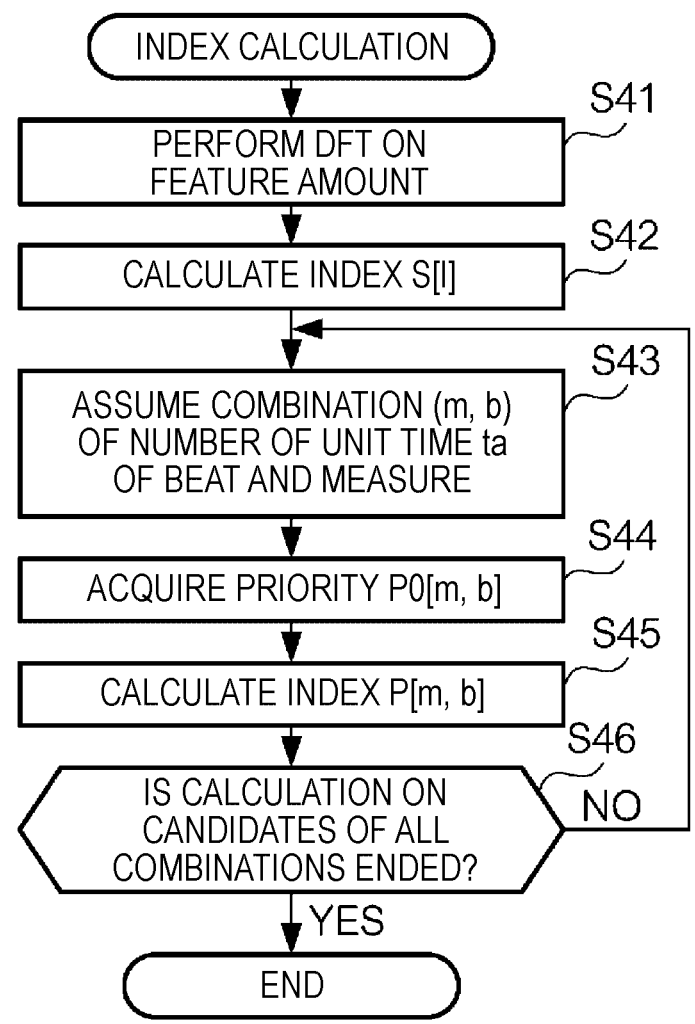
FIG. 4 is a flowchart illustrating details of an index calculation process.

FIG. 4 is a flowchart illustrating details of an index calculation process in Step S4. In Step S41, the index calculation unit 14 performs a discrete Fourier transform (DFT) on the MFCC in a time domain. With this configuration, an absolute value R[d, n] of the DFT is obtained (the following Equation (1)). "n" is a parameter corresponding to a frequency ($n \in [0, N]$).

[Equation 1]

$$R[d,n]=|DFT\{x[d,t]\}| \tag{1}$$

Figure 5:
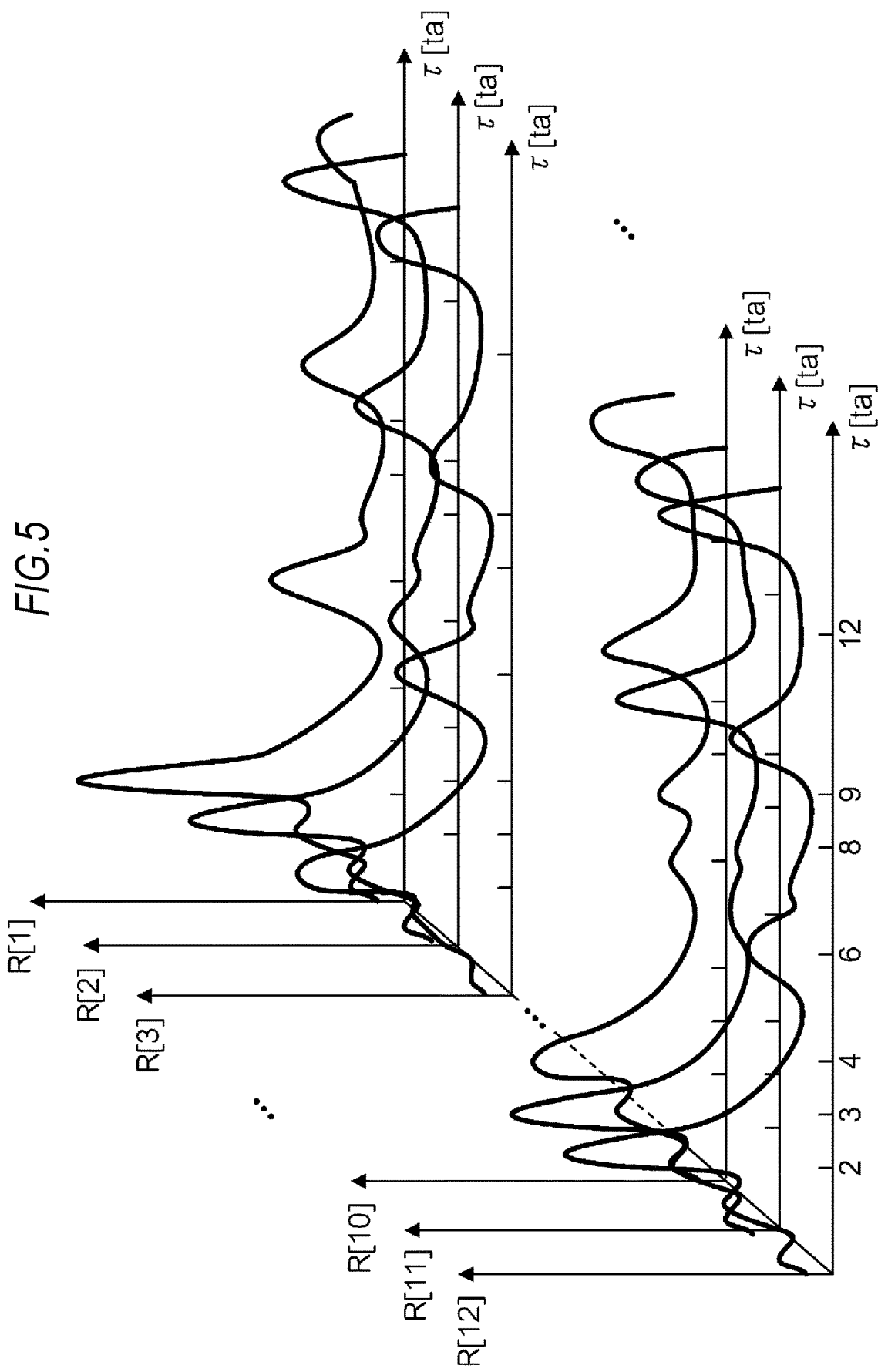
FIG. 5 is a diagram illustrating DFT results.

FIG. 5 is a diagram illustrating DFT results. The DFT results are obtained by the number corresponding to the dimension of the MFCC. For example, 12 results of the DFT are obtained in a case where the MFCC is a 12-dimensional vector. In the DFT results, the vertical axis represents a spectral intensity, and the horizontal axis represents a period τ[ta] using the unit time length to as a reference. For example, a peak appearing in period τ=3 is a peak corresponding to a repetition of period 3ta.

The description will be given with reference to FIG. 4 again. In Step S42, the index calculation unit 14 calculates an index S[l] from a plurality of DFT spectrums. The index S[l] indicates a strength represented by the repetition of a period l in the input sound signal ($l \in [0, L]$). Specifically, the index calculation unit 14 calculates a sum of products S[l] using the following Equation (2).

[Equation 2]

$$S[l]=\Sigma_n w[l,n](\Sigma_d R[d,n]) \quad (2)$$

Herein, w[l, n] is as follows.

[Equation 3]

$$w[l, n] = \frac{u[l, n]}{\sum_{n'} u[l, n']} \quad (3)$$

Further, u[l, n] is as follows.

[Equation 4]

$$u[l, n] = \exp\left\{-\lambda\left(\frac{N}{l-n}\right)^2\right\} \quad (4)$$

The Equations (2) to (4) show that data of surroundings corresponding to the period l in the amplitude DFT of length N is subjected to the sum of products. In other words, w[l, n] is a window function to cut the data out of surroundings of the period l. "$\lambda$" of Equation (4) is a constant which is experimentally determined. In other words, in Step S42, the index of the time lengths of one beat and one measure is calculated by applying the DFT results with the window function corresponding to the time lengths of one beat and one measure in the musical piece using the unit time length ta as a reference in a time domain.

Figure 6:
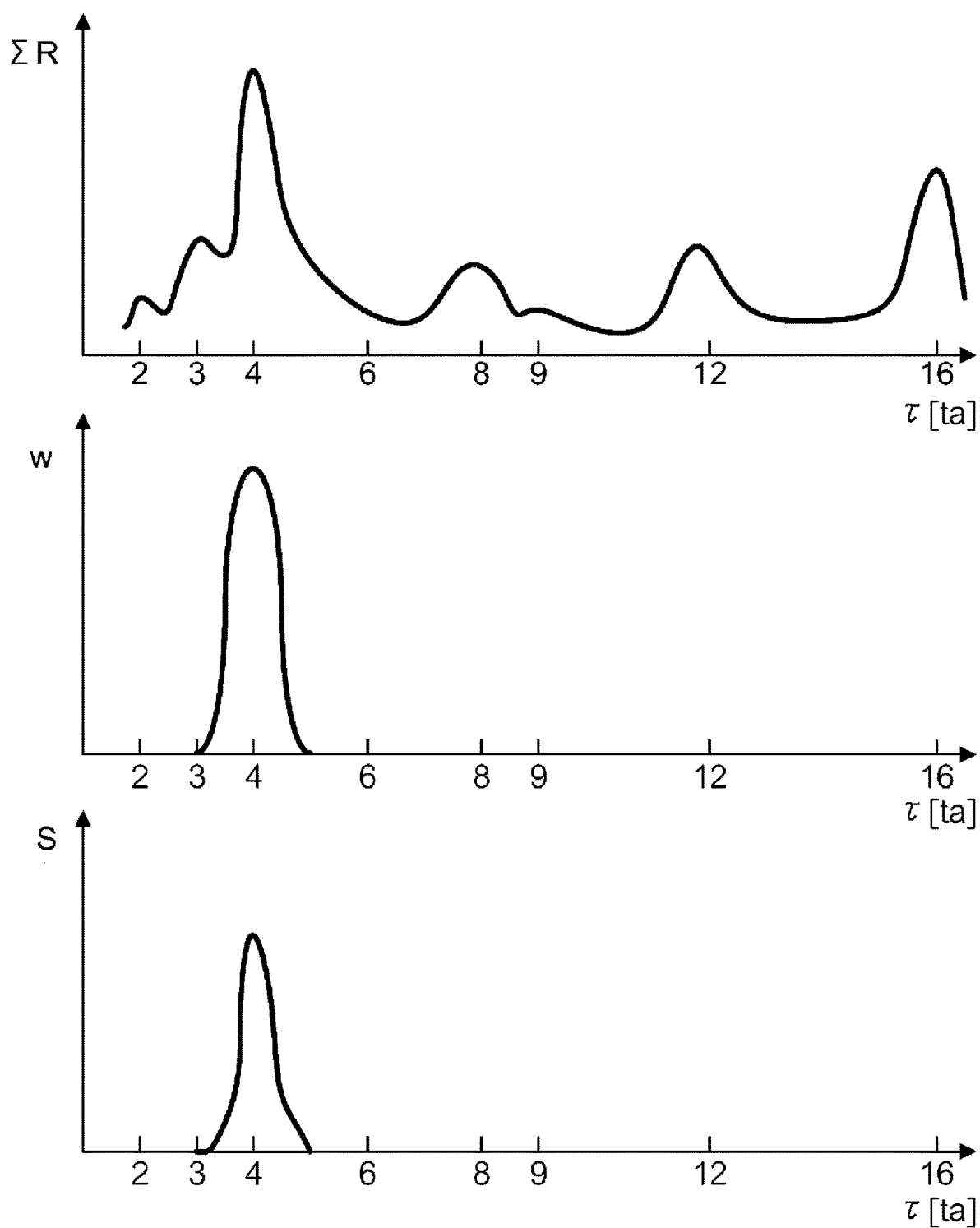
FIG. 6 is a diagram illustrating integrated DFT results.

FIG. 6 is a diagram illustrating the index S[l]. Herein, a DFT value ΣRd and the window function w[l, n] are shown together for the convenience of explanation. The drawing illustrates an example of l=4. The index S[l] corresponds to power (an area of the hatched region in the drawing) in the surroundings of the period l of the DFT spectrum. The index calculation unit 14 calculates the index S[l] in each of the plurality of periods l. The index calculation unit 14 stores the calculated S[l] in the storage unit 16.

The description will be given with reference to FIG. 4 again. In Step S43, the index calculation unit 14 assumes the number of unit time lengths ta which configure beats and measures. More specifically, the index calculation unit 14 assumes the number b of the unit time length ta of one beat and the number m of beats of one measure. In other words, the index calculation unit 14 assumes the length of one beat as b·ta, and assumes the length of one measure as m·b·ta.

In this example, the candidates of the combinations (m, b) of m and b are restricted in advance from the viewpoint of music. First, most of the musical pieces are 2 beats, 3 beats, or 4 beats. Therefore, for example, even in a case where there is a limitation to m∈{2, 3, 4}, there is no problem in many cases. When the unit time length ta is considered to correspond to an eighth note of a sixteenth note, even in a case where there is a limitation on m∈{2, 3, 4}, there is no problem in many cases. When m and b are limited as described above, the candidates of the combinations (m, b) are limited to 9 candidates. The storage unit 16 stores information which is used to specify a candidate of the combination. The index calculation unit 14 sequentially selects a combination among these 9 candidates. The limitation of the candidates of the combinations (m, b) described herein is given as merely exemplary, but the invention is not limited thereto.

In Step S44, the index calculation unit 14 acquires a priority P0[m, b] corresponding to the selected combination (m, b). The priority P0 is set in advance, and stored in the storage unit 16.

FIG. 7 is a diagram illustrating the priority P0 which is stored in the storage unit 16. Herein, the priority P0 is set to each of the combinations (m, b). Herein, for the convenience of explanation, Remark column is provided to show the beats of the combinations (an, b). The Remark column itself may be not stored in the storage unit 16. In this example, the priority P0 represents that a high probability that the combination (m, b) occurs is increased as the priority value is increased. For example, (in, b)=(4, 2) corresponds to 4/4 beats (the unit time length ta corresponds to an eighth note). Since the 4/4-beat musical piece is used often, P0[4, 2] is set to 1.0. On the other hand, (m, b)=(4, 3) corresponds to 12/8 beats, and the 12/8-beat musical piece is not so often used compared to the 4/4-beat musical piece. Therefore, P0[4, 3] is set to 0.1 herein. The index calculation unit 14 reads the selected combination (m, b) from among the priorities stored in the storage unit.

The description will be given with reference to FIG. 4 again. In Step S45, the index calculation unit 14 calculates an index P[m, b]. The index P[m, b] indicates the validity of the assumed combination (m, b). In this example, the combination (m, b) is valid as the value is increased. Specifically, the index calculation unit 14 calculates the index P[m, b] using the following Equation (5).

[Equation 5]

$$P[m,b]=s[b]+S[mb]+P_0[m,b] \quad (5)$$

As an example, in a case where (m, b) is (4, 4), the following Equation (6) is obtained.

[Equation 6]

$$P[4,4]=s[4]+S[16]+P_0[4,4] \quad (6)$$

The index calculation unit 14 stores the calculated index P[m, b] in the storage unit 16.

The index S[l] is necessarily calculated up to S[mb] which corresponds to a product of m and b. In other words, maximum values mmax and bmax of m and b are necessarily set such that the period l covers the following Equation (7).

[Equation 7]

$$l_{max}=m_{max} \cdot b_{max} \quad (7)$$

For example, in a case where mmax=4 and bmax=4, the following Equation (8) is obtained.

[Equation 8]

$$l \in \{2,3,4,6,8,9,12,16\} \quad (8)$$

Therefore, the index calculation unit 14 calculates the index S[l] in a range of Equation (8) in Step S42.

In Step S46, the index calculation unit 14 determines whether the indexes P[m, b] of all the candidates of the combinations of (m, b) are completely calculated. In addition, in a case where it is determined that there is a combination (m, b) of which the index P[m, b] is not calculated (S46: NO), the index calculation unit 14 causes the process to move to Step S43. Hereinafter, the combination (m, b) is updated, the processes of Steps S44 and S45 are repeatedly performed. In a case where it is determined that the indexes P[m, b] of all the candidates of the combinations are completely calculated (S46: YES), the index calculation unit 14 ends the flow of FIG. 4.

The description will be given with reference to FIG. 3 again. In Step S5, the estimation unit 15 estimates the most plausible combination (m, b) in the input sound signal. Specifically, the index calculation unit 14 estimates that the combination (m, b) having the highest index P[m, b] is plausible.

In Step S6, the output unit 17 outputs information on the combination (m, b) which is estimated by the estimation unit 15. The information on the combination (m, b) is, for example, a beat (4/4 beat, 4/3 beat, etc.) of the musical piece related to the input sound signal. Alternatively, the output unit 17 outputs a parameter to specify the combination (m, b). In a case the output destination is the user, the output information is displayed in a display for example. In a case where the output destination is another sound signal processing device, the output information is output as data for example.

3. Example

Table 1 shows results of beat estimation obtained by a method (example) according to the embodiments and a comparative example. The inventors of this application have performed the beat estimation using the methods according to the example and the comparative example performed on an actual musical piece, and evaluated an accurate rate. As the comparative example, there was used an algorithm of estimating all the beats of the musical piece as a 4/4 beat. As a target for the beat estimation, there were prepared 100 musical pieces of popular songs. The musical piece was classified into a 4-beat system (a numerator of the beat is a multiple of "2") and a 3-beat system (a numerator of the beat is a multiple of "3").

TABLE 1

| Classification | Accurate rate (%) | |
| --- | --- | --- |
| | Example | Comparative example |
| 4-beat system | 92 | 100 |
| 3-beat system | 100 | 0 |

In the example, the accurate rate to the musical piece of the 4-beat system is slightly smaller than the comparative example. However, the accurate rate to the musical piece of the 3-beat system is dramatically improved. Therefore, the accurate rate of the example is significantly improved compared to the comparative example as a whole.

4. Modifications

The present invention is not limited to the embodiment, but various modifications can be made. Hereinafter, some of modifications will be described. In the following modifications, two or more ones may be combined.

A specific computing method of the index P[m, b] is not limited to the one exemplified in the embodiment. For example, the priority P0 may be not taken into consideration. In other words, the third term on the right hand side of Equation (5) may be omitted.

In the embodiment, the candidates of the combinations (m, b) are limited from a musical viewpoint, but such a limitation may be not considered. For example, "m" and "b" each may be set in a different range of usable values. All of possible combinations (m, b) in those ranges may be candidates. In this case, it may be excluded a probability that a combination (m, b) having no musical meaning is estimated as most plausible by the priority P0. For example, a combination of (m, b)=(7, 3) corresponds to a 7/8 beat. However, since a 7/8 beat musical piece itself is rare, the priority P0 may be set to a low value (for example, a negative value).

In the example according to the embodiment, the number "m" indicates beats contained in one measure. However, the number "m" may indicate the unit time length to contained in one measure. In this case, the number "m" has to be an integer multiple of the number "b". Therefore, a case where the number "m" is not an integer multiple of the number "b" may be excluded when the candidates of the combinations (m, b) are limited. Alternatively, the candidates of the combinations (m, b) are not limited. The priority P0 corresponding to the combination (m, b) of which the number "m" is not an integer multiple of the number "b" may be set to an extremely low value (for example, $-\infty$)).

The tone feature amount is not limited to that described in the embodiment. For example, a feature amount other than the MFCC, such as a formant frequency and an LPC (Linear Predictive Coding) cepstrum, may be used.

The window function is not limited to that exemplified in Equation (3). Any function fotlaiat may be employed as long as a spectrum of the surroundings of the period l can be cut out.

In the example according to the embodiment, a single processing device has all the functions of FIG. 1. The functions of FIG. 1 may be divided into a client device and a server. For example, the feature amount calculation unit 13, the index calculation unit 14, the estimation unit 15, and the storage unit 16 may be mounted in the server, and the input sound acquisition unit 11, the unit-time acquisition unit 12, and the output unit 17 may be mounted in the client.

A program executed by the CPU 101 of the sound signal processing device 1 may be provided by a memory medium such as an optical disk, a magnetic disk, and a semiconductor memory, or may be downloaded through a communication line such as the Internet. The program has no need to include all the steps of FIG. 3. For example, the program may include only Steps S1, S2, and S6. The program may include only Steps S1, S2, and S3. Further, the program may include only Steps S1 and S6.

What is claimed is:

1. A sound signal processing method comprising:
   acquiring a unit time length in an input sound signal that indicates a musical piece;
   calculating a tone feature amount from the input sound signal;
   calculating, in a case where time lengths of one beat and one measure in the musical piece are assumed using the acquired unit time length in the input sound signal with respect to the tone feature amount, a first index that indicates validity of the assumed time lengths; and
   estimating the time lengths of one beat and one measure based on the first index.

2. The sound signal processing method according to claim 1, further comprising:
   performing an amplitude discrete Fourier transform on the tone feature amount in a time domain using the acquired unit time length; and
   calculating a second index of the time lengths of one beat and one measure by applying a window function corresponding to time lengths of one beat and one measure in the musical piece using the acquired unit time length in the time domain with respect to a result of the amplitude discrete Fourier transform, wherein the second index indicates a strength represented by the repetition of a given period in the input sound signal, wherein the first index is calculated using the second index of the time lengths of one beat and one measure.

3. The sound signal processing method according to claim 1, wherein the first index is calculated using a priority set in advance with respect to the assumed time lengths of one beat and one measure.

4. The sound signal processing method according to claim 1, wherein:
the calculating of the first index calculates the first index for each of a plurality of candidates of combinations of the assumed time lengths of one beat and one measure, and
the estimating selects one combination of the assumed time lengths of one beat and one measure is selected from among the plurality of candidates based on the first index.

5. The sound signal processing method according to claim 4, wherein a combination of the assumed time lengths of one beat and one measure in which the first index indicates a highest value is selected from among the first indexes calculated with respect to the plurality of candidates.

6. The sound signal processing method according to claim 1, further comprising outputting information on the time length of one beat and the time length of one measure of the estimated time lengths of one beat and one measure.

7. A sound signal processing device comprising:
at least one memory storing instructions; and
at least one processor configured to implement the stored instructions to execute a plurality of tasks, including:
a unit-time acquisition task that acquires a unit time length in an input sound signal that indicates a musical piece;
a feature amount calculation task that calculates a tone feature amount from the input sound signal;
a first index calculation task that calculates, in a case where time lengths of one beat and one measure in the musical piece are assumed using the acquired unit time length in the input sound signal with respect to the tone feature amount, a first index that indicates validity of the assumed time lengths; and
an estimation task that estimates the time lengths of one beat and one measure based on the first index.

8. The sound signal processing device according to claim 7, wherein:
the plurality of tasks include a second index calculation task that performs an amplitude discrete Fourier transform on the tone feature amount in a time domain using the acquired unit time length, and calculates a second index of the time lengths of one beat and one measure by applying a window function corresponding to time lengths of one beat and one measure in the musical piece using the acquired unit time length in the time domain with respect to a result of the amplitude discrete Fourier transform, wherein the second index indicates a strength represented by the repetition of a given period in the input sound signal, and
the first index calculation task calculates the first index using the second index of the time lengths of one beat and one measure.

9. The sound signal processing device according to claim 7, wherein the first index calculation task calculates the first index using a priority set in advance with respect to the assumed time lengths of one beat and one measure.

10. The sound signal processing device according to claim 7, further comprising:
a storage device that stores in advance information on a plurality of candidates of combinations of the assumed time lengths of one beat and one measure,
wherein the first index calculation task calculates the first index for each of the plurality of candidates of combinations of the assumed time lengths of one beat and one measure from the information stored in the storage, and
wherein the estimation task selects one combination of the assumed time lengths of one beat and one measure from among the plurality of candidates based on the first index.

11. The sound signal processing device according to claim 10, wherein the estimation task selects a combination of the assumed time lengths of one beat and one measure in which the first index indicates a highest value from among the first indexes calculated with respect to the plurality of candidates.

12. The sound signal processing device according to claim 7, further comprising an output interface that outputs information on the time length of one beat and the time length of one measure of the estimated time lengths of one beat and one measure.

* * * * *